May 27, 1969        G. R. GRIFFIN ET AL        3,446,561
PASSIVE BRIGHT PATTERN RETICLE
Filed Sept. 29, 1965
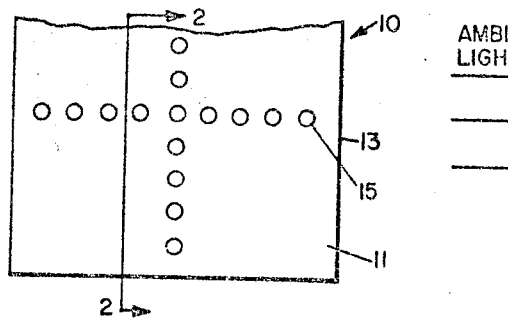
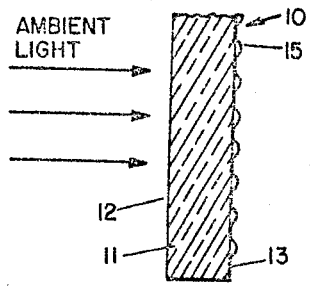
Fig. 1      Fig. 2
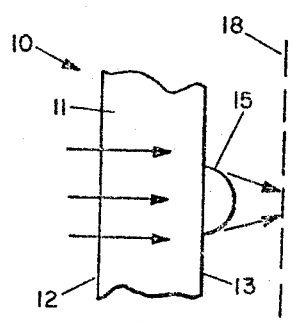
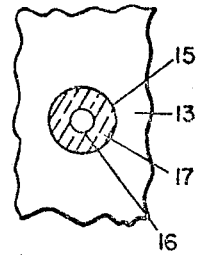
Fig. 3      Fig. 4
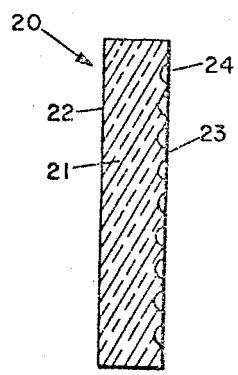
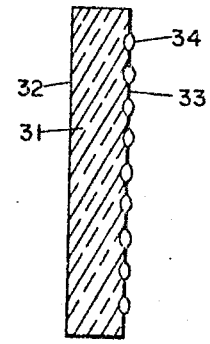
Fig. 5      Fig. 6
INVENTORS:
GORDON R. GRIFFIN
HERBERT MEYER
ATTORNEY:
WILLIAM A. KEMMEL JR.

United States Patent Office 3,446,561
Patented May 27, 1969

3,446,561
PASSIVE BRIGHT PATTERN RETICLE
Gordon R. Griffin, Claremont, and Herbert Meyer, Pasadena, Calif., assignors to Electro-Optical Systems, Inc., Pasadena, Calif., a corporation of California
Filed Sept. 29, 1965, Ser. No. 491,161
Int. Cl. G01c 1/00
U.S. Cl. 356—147   6 Claims

ABSTRACT OF THE DISCLOSURE

This application relates to a reticle for superimposing a desired pattern onto a viewed image. The reticle comprises a transparent plate having embedded therein, in the desired pattern, a plurality of bodies having flat surfaces coplanar with the light-emitting surface of the reticle and adapted to form an image outside said plate closely adjacent said surface. The reticle is also claimed in combination with a lens system and image intensifier means.

---

In general, the present invention relates to a reticle adapted to produce a bright pattern from ambient light. More particularly, the present invention relates to a reticle adapted to be utilized at low ambient light levels without the necessity of employing a secondary light source for the reticle pattern.

In general, the conventional reticle is simply a system of lines or dots which form a pattern such as cross hairs on the focus of the eye piece of an optical instrument such as a weapon sight. However, it has been known for many years that such conventional reticles are often not suitable where the optical instrument is being utilized at low ambient light levels such as at night. Consequently, there have been developed reticles which employ a secondary light source to form a bright image of the reticle and such image is projected onto the focus of the eye piece of the optical instrument. An example of such active reticle is U.S. Patent No. 2,420,503, dated May 13, 1947, issued to Stechbart. Such active reticles provide a bright pattern imposed on the field of view and thus permit the proper orientation of the optical instrument or sight and its related system such as a weapon. However, such active reticles require their own separate optical system, including at least a light source and a projection lens for incorporating it in the total optical system. Such subsystem necessarily increases the size, weight, and complexity of the optical system and frequently represents a significant portion of the total cost of the total optical system.

Consequently, an object of the present invention is a passive reticle adapted to produce a bright pattern from ambient light including not only visible light but also light in the ultraviolet and infrared regions.

Another object of the present invention is a simply constructed reticle adapted to produce a bright pattern from ambient light of low light level without the use of a secondary light source for projecting such reticle.

Another object of the present invention is a simple, inexpensive, rugged reticle adapted to produce a bright light pattern from ambient light.

Other objects and advantages of the present invention will be readily apparent from the following description and drawings which illustrate the preferred exemplary embodiment of the present invention.

In general, the present invention involves a reticle adapted to produce a bright pattern from ambient light traveling in a medium of specified refractive index. The reticle consists essentially of at least one body of light transmitting material adjoining said ambient light medium with said body forming both the desired reticle pattern and a condensing lens system adapted to form an image at the desired image plane. Also, said body has a substantially higher refractive index than the ambient light medium.

In order to facilitate understanding of the present invention, reference will now be made to the appended drawings of a preferred specific embodiment of the present invention. Such drawings should not be construed as limiting the invention which is properly set forth in the appended claims.

In the drawings:

FIG. 1 is a plan view of the reticle of the present invention.

FIG. 2 is a cross sectional view of FIG. 1 taken along the lines 2—2 of FIG. 1.

FIG. 3 is an enlargement of a portion of FIG. 2 showing the operation of the reticle of the present invention.

FIG. 4 is a rear view of a portion of FIG. 3 showing the results of the present invention.

FIG. 5 is a cross sectional view of another embodiment of the reticle of the present invention.

FIG. 6 is across sectional view of still another embodiment of the reticle of the present invention.

As illustrated in FIGS. 1 and 2, the present invention is a reticle 10 which is adapted to produce a bright pattern from ambient light, particularly at low light levels such as at night. The reticle 10 comprises a first body of light transmitting material consisting of the transparent plate 11 which has a first surface 12 adapted to receive the incoming ambient light and a second surface 13 adapted to emit said ambient light. The plate 11 has a selected refractive index and may be made of glass, plastic, or any other optically clear material. Joined to the second surface 13 of the plate 11 is a plurality of discrete second bodies consisting of hemispheres 15. The hemispheres are placed so as to form the desired reticle pattern and are adapted to form a condensing lens system which projects the reticle image onto the desired image plane. Also, the hemispheres 15 have a substantially higher refractive index than the plate 11 and may be made of plastic. For example, the plate 11 may be made of glass having an index of refraction of 1.5, while the beads 15 may be made of polystyrene having an index of refraction of 1.6.

The beads 15 may be joined to the plate 11 in any convenient manner. For example, in the case of plastic beads, they may be heated and then pressed against the plate to cause their adhesion to the plate. Also, a layer of pressure sensitive adhesive may be used.

The operation of the reticle 10 is illustrated schematically in FIGS. 3 and 4. As thus shown, the incoming ambient light is focused by the hemispheres 15 into a bright dot 16 with a dark halo 17 on the image plane 18. The dimensions of the dot and halo depend upon the dimensions of the spheres and indices of refraction of the plate and spheres and upon the unidirectionality or omnidirectionality of incoming light. However, in all cases, the results is to concentrate the ambient light to create a bright image of reticle pattern upon the image plane. Such image plane may be the surface of a conventional image tube used in present weapon sights.

Another specific embodiment of the present invention is illustrated in FIG. 5 wherein the reticle 20 comprises a plate 21 having a first surface 22 adjacent the incoming ambient light and the second surface 23 from which the light is emitted. Set in the second surface 23 is a series of hemispheres 24 having an index of refraction substantially greater than the refractive index of the plate 21. In FIG. 6, the reticle 30 comprises a plate 31 having a light receiving surface 32 and a light emitting surface 33. Adjoining the light emitting surface 33 is a series of lenses 34 having a substantially higher index of refraction than the plate 31. The operation of both reticles 20 and 30 is substantially the same as reticle 10 in that a bright dot with a dark halo is generated upon the adjoining image plane.

Many other specific embodiments of the present invention will be obvious to one skilled in the art in view of this disclosure. Thus, as used herein, the term "ambient light" usually refers to the light from the surroundings of the system which enters the sight. However, at very low light levels, such light may be augmented by a fluorescent or radioactive source within the weapon sight so that the light received by the reticle is sufficiently high to make the reticle apparent to the observer's eye. Hence, ambient light includes light from the surroundings entering the weapon sight as well as light added thereto from an artificial source in the sight. Also, the first body of light transmitting material such as the glass plate serves effectively to insure that the incoming ambient light is traveling in a medium of specified refractive index relative to the second light transmitting bodies forming the reticle pattern. Such first body serves as a simple, rugged support for the bodies forming the reticle pattern. However, the first body may be eliminated by having the bodies forming the reticle pattern supported by other means and receiving the ambient light traveling in air or vacuum. Also, the first body may have other configurations besides simply a plate where it is desired to have the light travel a more complicated path. Similarly, a second body may have a variety of shapes such as hemispheres, spheres, lenses, cylinders, and so forth as long as they form the desired reticle pattern and a condensing lens system which projects an image at the desired image plane.

There are many features in the present invention which clearly show the significant advance the present invention represents over the prior art. Consequently, only a few of the more outstanding features will be pointed out to illustrate the unexpected and unusual results attained by the present invention. The outstanding advantage of the present invention is that it can take a low level of ambient light and utilize such light to generate a bright reticle pattern without the necessity of using a secondary light source. Thus, the reticle of the present invention has been found capable of viewing a scene at night and giving sufficiently bright reticle patterns to permit orientation of the optical device. It should be noted that the concentration of the light by the reticle not only produces a bright dot or line but also produces an adjoining dark area so that a sharp contrast is produced to which the eye is very sensitive. If a artificial light source is used to supplement the light from the surroundings then it is simply added to such light without requiring a separate projection system. Hence, the reticle image is formed by the total of such ambient light. Another advantage of the present invention is its obvious simplicity of construction and operation thus permitting inexpensive construction and resistance to rough handling.

It will be understood that the foregoing description and examples are only illustrative of the present invention and it is not intended that the invention be limited thereto.

All substitutions, alternations, modifications of the present invention which come within the scope of the following claims or to which the present invention is readily susceptible without departing from the spirit and scope of this disclosure are considered part of the present invention.

We claim:
1. A reticle adapted to produce a bright pattern from ambient light comprising:
   (a) a transparent plate having a first surface adapted to receive incoming ambient light and a second surface adapted to emit said ambient light therethrough, said plate having a selected refractive index; and,
   (b) a plurality of bodies of light transmitting material embedded in said second surface of said plate, said bodies (I) forming the desired reticle pattern, (II) each having a flat surface co-planar with said second surface, (III) forming a condensing lens system adapted to form an image at a desired image plane outside said plate and closely adjacent said second surface, and (IV) having a substantially higher refractive index than said plate.

2. A reticle as stated in claim 1 wherein said plurality of bodies are hemispheres.

3. Means to form a bright image pattern from low-level ambient light comprising a reticle comprising a first body of light transmitting material having a first surface adapted to receive incoming ambient light and a second surface adapted to emit said ambient light therethrough, said first body of material having a selected refractive index, and a plurality of bodies of light transmitting material joined to the second surface of said first body, said bodies (I) forming the desired reticle pattern, (II) forming a condensing lens system adapted to form an image at a desired image plane outside said first body and closely adjacent said second surface, (III) having a substantially higher refractive index than said first body.

4. The means of claim 3 wherein said bodies comprise a plurality of hemispheres embedded in said first body, the flat surfaces of said hemispheres being co-planar with said second surface of said first body.

5. The means as stated in claim 3 wherein said first body is a transparent plate.

6. A reticle as stated in claim 3 wherein each of said plurality of bodies have a flat surface adjoining said first body.

References Cited

UNITED STATES PATENTS 2,393,308   1/1946   Brown.

RONALD L. WIBERT, *Primary Examiner.*

O. B. CHEW II, *Assistant Examiner.*

U.S. Cl. X.R.

33—50; 350—167